United States Patent [19]

Tedesco et al.

[11] Patent Number: 5,011,284

[45] Date of Patent: Apr. 30, 1991

[54] DETECTION SYSTEM FOR RAMAN SCATTERING EMPLOYING HOLOGRAPHIC DIFFRACTION

[75] Inventors: James M. Tedesco, Livonia; Harry Owen, Saline; Byung J. Chang, Ann Arbor, all of Mich.

[73] Assignee: Kaiser Optical Systems, Ann Arbor, Mich.

[21] Appl. No.: 497,238

[22] Filed: Mar. 22, 1990

[51] Int. Cl.[5] .......................... G01N 21/65; G01J 3/44
[52] U.S. Cl. .................................... 356/301; 356/334; 350/3.7
[58] Field of Search ............... 356/301, 318, 328, 334; 350/3.7

[56] References Cited

U.S. PATENT DOCUMENTS 4,586,819  5/1986  Tochigi et al. ..................... 356/301
4,856,897  8/1989  Fateley et al. ..................... 356/301

Primary Examiner—Vincent P. McGraw
Attorney, Agent, or Firm—Krass & Young

[57] ABSTRACT

The Raman scattering detector of this invention includes a source of collimated monochromatic illumination, a cube formed of two right angle prisms, a holographic optical element disposed between the prisms, a concentrating lens, a focusing lens and one or more photo detectors. The illuminating beam passes through the cube and is concentrated by the concentrating leans to a sample. Scattered light returned to the concentrating lens is substantially collimated upon return to the cube. The holographic optical element diffracts light at desired Raman wavelengths approximately 90 degrees without substantially affecting the original wavelength. The holographic optical element further disperses light at desired Raman wavelengths permitting them to be separated. The diffracted and dispersed wavelengths are focused on one or more detectors by the focusing lens.

16 Claims, 3 Drawing Sheets

DETECTION SYSTEM FOR RAMAN SCATTERING EMPLOYING HOLOGRAPHIC DIFFRACTION

TECHNICAL FIELD OF THE INVENTION

The invention described herein is a detection system for Raman scattering spectroscopy. It is particularly useful in applications where the Raman scattering components are expected certain discrete wavelengths. Such applications are found, for example, in various medical diagnostic instruments and other instruments for molecular characterization of illuminated samples.

BACKGROUND OF THE INVENTION

Scattering is the change in directional distribution of radiation imparted by its passing through matter. It is usually observed using substantially monochromatic radiation, such as that from a laser or monochromator. Most of the scattered radiation is observed to have the same wavelength as that of the incident light. This directional redistribution without change in wavelength is referred to as Rayleigh scattering. A small percentage of the radiation may be scattered at a number of discrete frequencies above and below that of the incident radiation. The lines found at longer wavelengths, which are called Stokes lines, are more intense than those found at shorter wavelengths, called anti-Stokes lines. The occurrence of these discrete lines in the spectrum of the scattered light, in addition to the line of the incident light, is called the Raman effect.

Raman scattering is similar to fluorescence except for the nature of the energy-level transitions involved. Fluorescence is the emission of photons due to transitions of electrons or molecules between stable quantum energy levels after excitation by incident light. Hence, the fluorescence of a particular material always occurs at discrete wavelengths defined by the difference between that material's stable energy levels. Raman scattering is photon emission due to the transition from an unstable energy level excited by the incident light to one of the material's stable energy levels other than its initial or ground state. Hence, the Raman scattered wavelengths are functions of the differences between the material,s stable energy levels and the energy of the incident light photons, which is dependent upon the incident wavelength.

The net effect of this dependence on the wavelength of the incident light is that the wavelengths of the Raman spectrum of any given material have a predetermined difference from the wavelength of the incident light. In other words, if a Raman spectrum is measured with one wavelength of incident light, and then measured a second time using a different wavelength of incident light, the same Raman wavelength line pattern will be measured, but shifted in wavelength. The number of Raman lines and their wavelength shifts from the incident wavelength remain constant.

The wavelength shifts of the Raman lines, their intensity, and their polarization are characteristics of the scattering substance. Raman spectroscopy has proven to be very useful in characterizing the molecular content of unknown materials in, for example, the chemistry and medical testing industries.

To understand the advantages of this invention, it is helpful to first understand the basics of the current art of Raman spectroscopy. A typical prior art "general purpose" system having high sensitivity includes a polarized Argon ion laser which is focused on a sample cell. The Raman and Rayleigh scattering are collected by a lens, polarized, filtered, and focused to the entrance aperture of a double monochromator. The double monochromator uses multiple gratings to disperse the collected light into its wavelength spectrum, which is then detected by a photomultiplier tube. A continuous wavelength spectrum is scanned by mechanically rotating one or more elements in the monochromator to direct the desired wavelength path onto the photomultiplier tube.

The high-cost items in this typical package are the Argon laser, the collection lens, the double monochromator, and the photomultiplier tube. All are used because of the sensitivity required to measure Raman line intensities that are typically several orders or magnitude below that of the incident light. The Argon laser is used because of its high available power and short blue-green wavelength (the intensity of Raman scattering is proportional to the fourth power of the frequency of the incident light). The collections lens is simultaneously achromatic, large aperture, and low f/number to collect as much of the scattered light as possible. The double monochromator is used to provide a high-resolution wavelength separation with high Rayleigh and stray light rejection for low noise. The PMT is used to detect the extremely low Raman light levels present at the end of the optical path.

SUMMARY OF THE INVENTION

The present invention is a simple Raman scattering detection system of high sensitivity and large spectral dispersion, capable of construction at low cost. This system includes a cube formed of two right angle prisms. A collimated monochromatic beam, such as produced by a laser and collimating lens combination, illuminates one face of the cube. This beam passes through the cube and is concentrated by an aspheric concentrating lens on the sample. Scattered light, both at the same and differing wavelengths relative to the illuminating beam, through a cone of angles is collected by the concentrating lens and directed to the prism. A holographic optical element disposed between the right angle prisms at an angle to the illuminating beam diffracts and spectrally disperses light at Raman wavelengths through an angle of about 90 degrees though a face of the cube perpendicular to the illuminated face. The holographic optical element is constructed to pass light of the illuminating wavelength without significant diffraction. A lens focuses the exiting Raman wavelengths to one or more detectors disposed at locations corresponding to particular Raman wavelengths.

An alternative embodiment is suitable for high volume, low cost production. A combination laser diode and collimating lens pre-aligned and permanently potted on to one face of the cube produces the illuminating beam. The concentrator lens is formed by an integrated aspheric surface on the face of the cube opposite the illumination. Likewise, an integrated surface on a perpendicular face of the cube forms the focusing lens. The detector may be a photosensitive array such as a charge coupled device, a multiplicity of discrete detectors or a single semiconductor photo detector movable to locations of a number of Raman wavelengths.

BRIEF DESCRIPTION OF THE DRAWINGS

These and other objects and aspects of the present invention will become clear from the following description of the invention in conjunction with the FIGURES, in which.

DETAILED DESCRIPTION OF THE PREFERRED EMBODIMENTS

This invention is characterized primarily by its low cost and compact size relative to the prior art. It is particularly useful in special purpose applications where a reasonable number of known, discrete Raman lines are to be examined. An example of such an application is an instrument to test for the presence and levels of a particular substance having a distinct and known Raman "signature."

Figure 1:
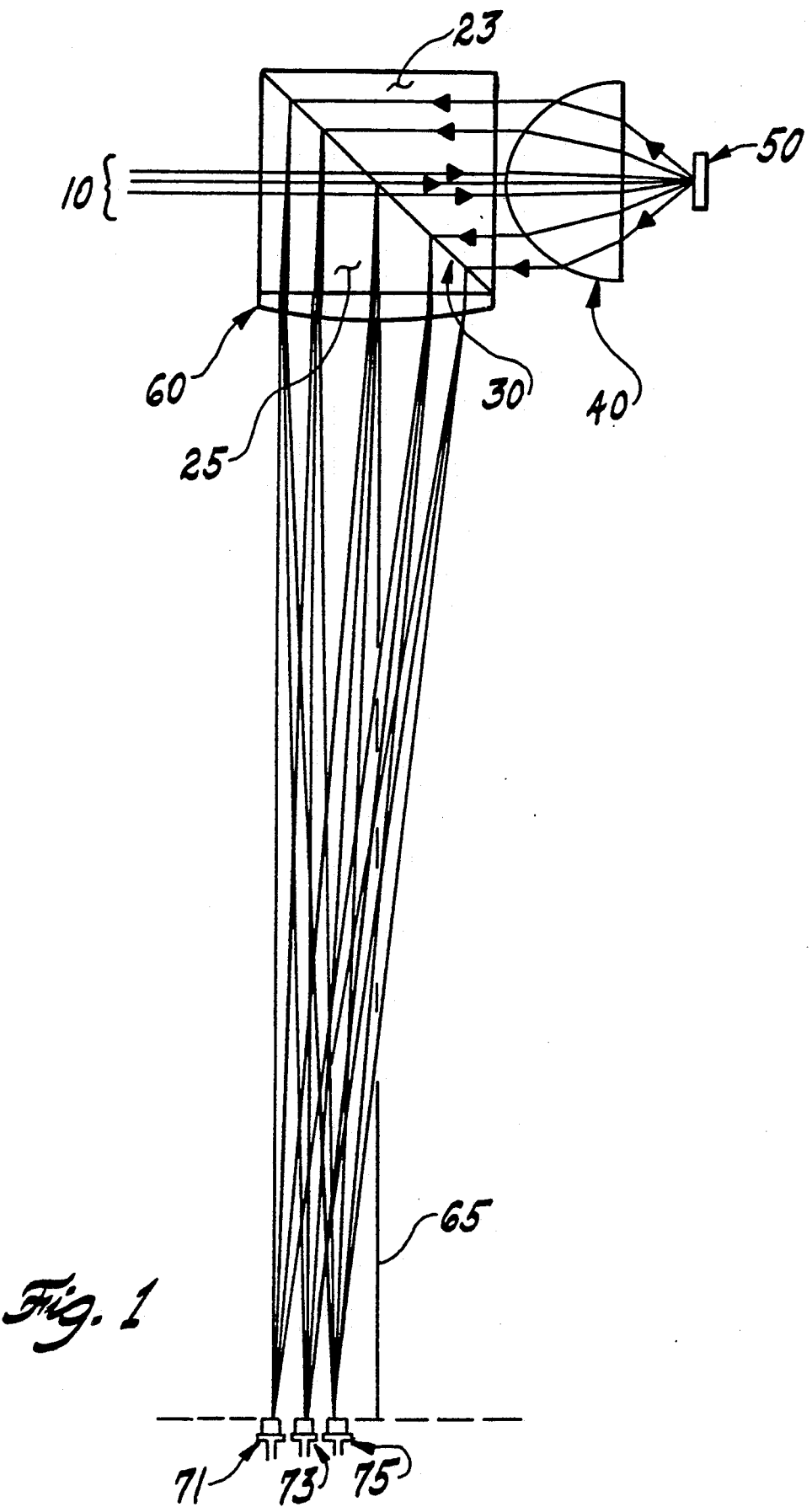
FIG. 1 illustrates the preferred embodiment of the detection system for Raman scattering of this invention.

FIG. 1 illustrates one embodiment of the invention. Collimated monochromatic beam 10, such as produced by a conventional laser and collimating lens combination, is directed to one face of a cube formed by right-angle prisms 23 and 25. Beam 10 has a wavelength of $\lambda_0$. The spectral characteristics of the embedded holographic optical element 30 are such that the light of wavelength $\lambda_0$ passes through it relatively unaffected. The collimated beam 10 passes through to the opposite face of the cube and is then focused by a concentrator lens 40 onto a sample cell 50 containing the material being tested. The Raman scattering induced by the illumination is collected and collimated by the same concentrator lens 40, after which it enters the cube. The Raman lines of interest are diffracted through a large angle (near 90 degrees) and angularly dispersed by the embedded holographic optical element 30. The Rayleigh scattered radiation, being at the same wavelength as the incident laser, also passes through the holographic optical element 30 relatively unaffected. A focus lens 60 attached to the cube focuses each Raman line of interest onto a different detector. In the design illustrated in FIG. 1, there are three different wavelengths, $\lambda_1$, $\lambda_2$, and $\lambda_3$, being focused onto three discrete semiconductor photo detectors (71, 73, and 75).

This simple system can achieve sufficient detection sensitivity using relatively inexpensive laser diode sources and discrete solid state detectors, owing to the high efficiencies of the optical paths. Substantially all of the illumination laser energy is focused onto a region of the sample cell whose Raman scattering will be imaged onto the detectors. The concentrator lens 40 may have a speed of F/0.6 thereby collecting an extremely large cone angle of the randomly scattered light for efficient diffraction by the volume transmission holographic optical element 30 (described below) and focusing to the detectors.

Note that, in the design of FIG. 1, the hologram 30 is designed to direct the Raman wavelengths of interest to detectors that are skewed to one side of the optical axis 65 formed by the cube and focus lens 60. This geometry prevents any small Fresnel reflections of the illuminating beam 10 due to refractive index discontinuities at the holographic optical element 30 from focusing on one of the Raman line detectors. Note also that holographic optical element 30 can efficiently diffract only S-polarized light (electric field vector perpendicular to the plane of incidence) due to the near 90 degree angle between the incident and diffracted light. The beam 10 should therefore be polarized in this orientation.

The cost and size advantages of this configuration are obvious. For cube and lens dimensions up to 2 inches (the size currently contemplated for implementation of this design), all of the components except for holographic optical element 30 are available at low cost as "off the shelf" catalog items. This includes right angle prisms 23 and 25, aspheric concentrator lens 40, focus lens 60, and semiconductor photo detectors 71, 73, 75. The electronics required to amplify/process the detected Raman signals are straightforward. The holographic optical element 30 is readily made at high efficiency using simple collimated exposure beams and standard techniques described below. The size of the system may be scaled up or down as desired to fit practical considerations such as discrete detector separation, illumination spot size at sample cell 50, sample cell positioning tolerances, depth of focus, etc.

Figure 2:
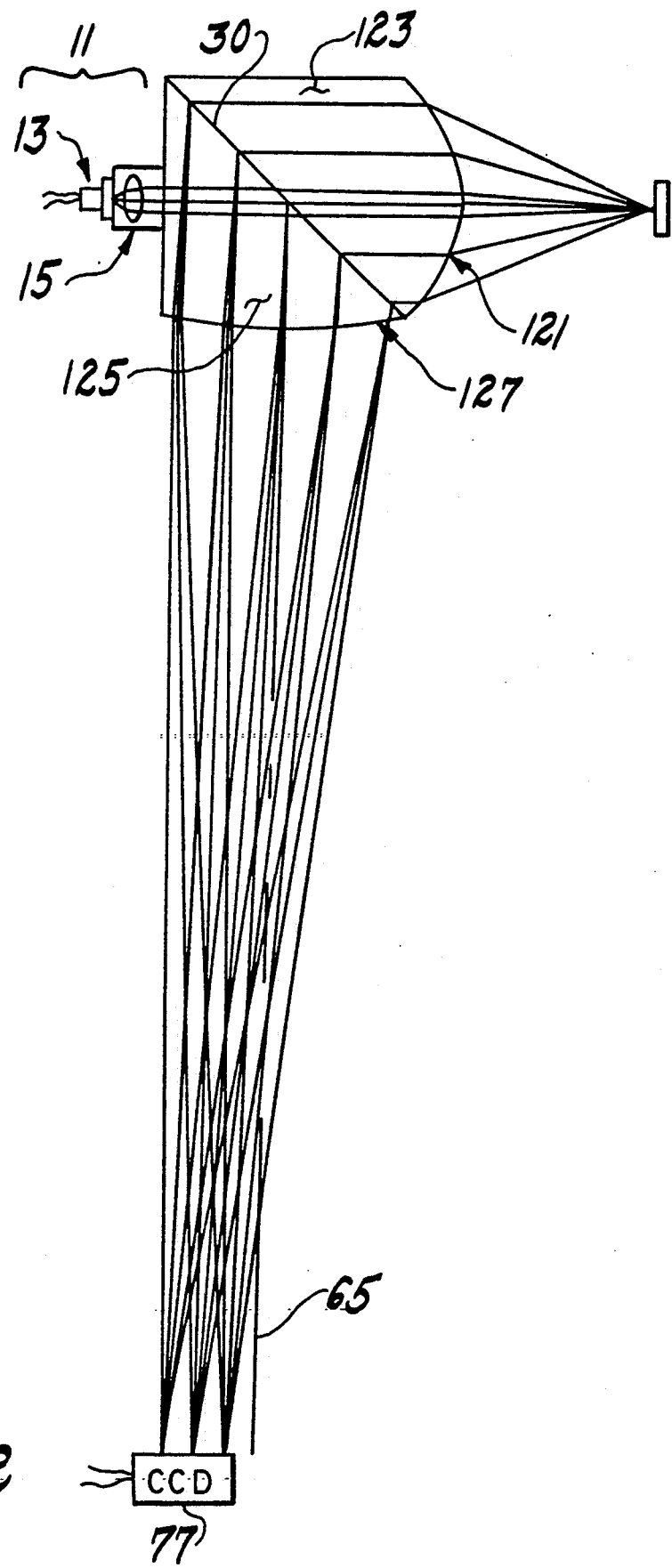
FIG. 2 illustrates an alternative embodiment of the detection system of this invention employing integrated optical elements.

FIG. 2 illustrates an alternative embodiment of the present invention suitable for high volume, low cost production. Beam 10 is produced by integrated assembly 11 which includes laser diode 13 and collimating lens 15. Laser diode 13 and collimating lens 15 are properly aligned and then permanently "potted" in place on one face of the cube. Prism 23 and concentrator lens 40 are replaced in this embodiment by a single optical element 123. Optical element 123 is substantially the same as prism 23 except that the far planar face of prism 23 is replaced by integrated surface 121. Integrated surface 121 is aspheric and functions as the concentrator lens. In a like manner, optical element 125 replaces prism 25 and focusing lens 60, with integrated surface 127 functioning as the focusing lens. Charged coupled device 77 is a linear detector array of light sensitive elements disposed at the focal plane of integrated surface 127. The closely spaced light sensitive elements of charge coupled device 77 are used to reduce the system size, accommodate a large number of closely spaced Raman wavelengths or to sample a continuous spectrum.

The embodiment illustrated in FIG. 2 virtually eliminates field alignment problems. Laser diode 13 and collimating lens 15 are permanently aligned during construction. Integrated surfaces 121 and 127 form lenses permanently aligned to their respective prisms. As a result of this construction, there is a much reduced capability for misalignment.

Figure 3:
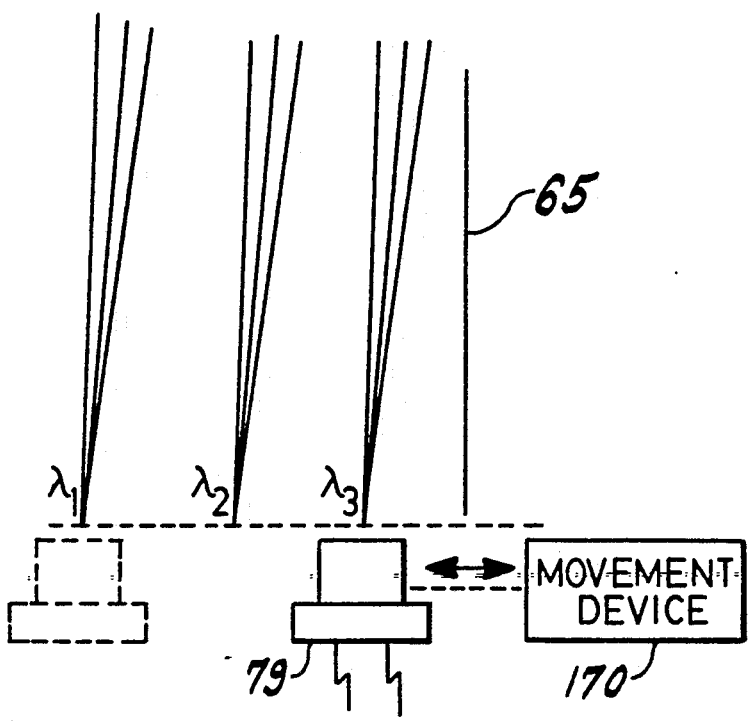
FIG. 3 illustrates an alternative embodiment of the detector array of this invention comprising a single scanning detector.

FIG. 3 illustrates a yet further alternative for the detector array. A single semiconductor photo detector 79 is employed. Detector 79 is movable the focal plane by movement device I70. This movement permits a single detector 79 to sequentially detect light at the plural wavelengths $\lambda_1$, $\lambda_2$, and $\lambda_3$, or at a continuum of wavelengths.

Figure 4:
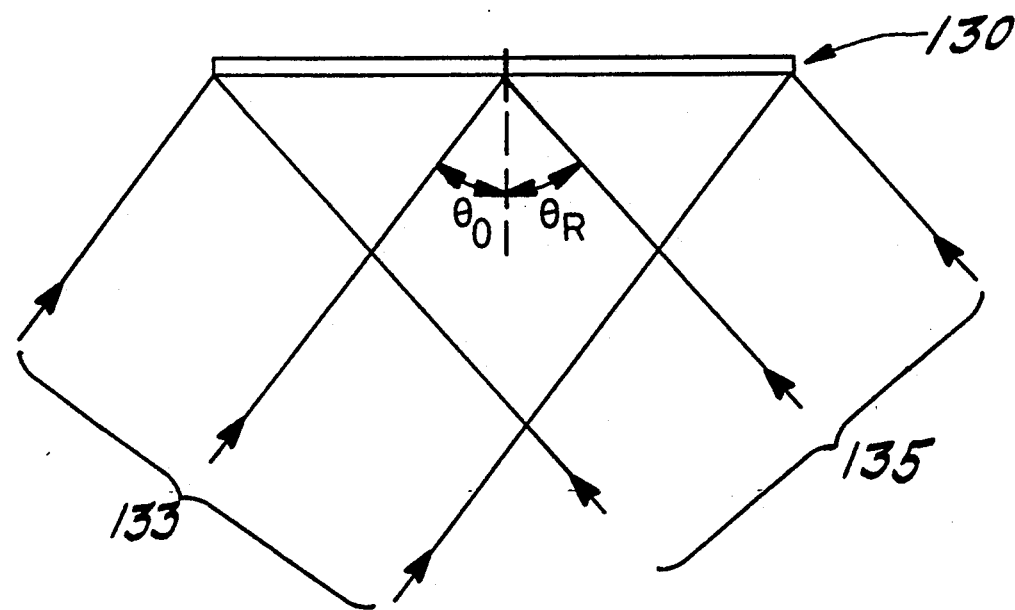
FIG. 4 illustrates the manner of construction of the holographic optical element in accordance with an example of this invention.

The manner of construction of holographic optical element 30 for a particular medical testing device that uses a laser diode having a wavelength $\lambda_0$ of 780nm, and is to detect three Raman scattering lines at 860nm, 868nm, and 876nm ($\lambda_1$, $\lambda_2$, and $\lambda_3$, respectively) is shown in FIG. 4. A holographic film 130 of dichromated gelatin or of a photopolymer is exposed in air using 2 collimated beams from the 514.5nm line of an Argon ion laser. Holographic film 130 used for a detection system with a 2 inch cube is a 2.00 inch by 2.83 inch plate. The object beam 133 has an exposure angle $\theta_O$ of 30.12°. The reference beam 135 has an exposure angle $\theta_R$ of 40.42°. These angles in air at the wavelength of 514.5 nm form interference fringes having a spatial frequency to efficiently diffract light at the wavelengths $\lambda_1$, $\lambda_2$, and $\lambda_3$ *through approximately* 90° within the cube.

The thickness and refractive index modulation of holographic optical element 30 are designed to provide high diffraction efficiency at the three Raman lines of interest, and low diffraction efficiency at the 780nm laser diode wavelength. Low 780nm diffraction efficiency is desired to allow as much illumination energy as possible to the sample cell. Any small diffraction components at 780nm will direct the laser light and Rayleigh scattering in harmless directions where they can be baffled and absorbed.

Using a rigorous coupled wave theory analysis we have found that a film thickness of 5 microns and a refractive index modulation of 0.06 provide a theoretical diffraction efficiency in excess of 94 percent (S polarization) for all three Raman scattering lines. These parameters are readily achievable in either dichromated gelatin or photopolymer holographic film. The same parameters also keep the unwanted 780nm diffraction below 15 percent, allowing high illumination efficiency.

Advantages of this device relative to the current art include low cost, compact size, and ruqqed oonstruction with low susceptibility to misalignment. These are achieved through a novel application of a transmission holographic optical element deposited on the diagonal of a cube. Other elements of the device are readily available, massproducible items, including a collimated laser diode, a molded aspheric concentrator lens, a simple plano-convex lens, and semiconductor photo detectors for the number of wavelengths being sensed. In comparison, the prior art typically requires expensive and delicate equipment such as a high-power gas laser, a double monochromator, and a photomultiplier tube to achieve sufficient sensitivity levels.

We claim:

1. A Raman scattering detector comprising:
   a source of collimated, substantially monochromatic light along a primary optical axis;
   a first right angle prism having a first right angle face disposed perpendicular to said primary optical axis, a second right angle face disposed parallel to said primary optical axis, and an oblique face;
   a holographic optical element disposed parallel to said oblique face of said first right angle prism, said holographic optical element having embedded therein regions of alternating indices of refraction for passing said monochromatic light substantially undiffracted while diffracting light at the wavelengths of expected Raman scattered light through an angle of approximately 90 degrees;
   a second right angle prism having an oblique face disposed parallel to said holographic optical element, and a first right angle face disposed perpendicular to said primary optical axis;
   a sample cell disposed on said primary optical axis beyond said first right angle face of said second right angle prism for holding a sample substance to be irradiated;
   a concentrating lens disposed perpendicular to said primary optical axis between said first right angle face of said second right angle prism and said sample cell for concentrating said monochromatic light on the sample within said sample cell and for collimating Raman scattered light parallel to said primary optical axis;
   a focussing lens disposed parallel to said second right angle face of said first right angle prism having a secondary optical axis perpendicular to said primary optical axis for focussing Raman scattered light diffracted by said holographic optical element at a focal plane; and
   at least one photosensitive detector disposed on said focal plane of said focussing lens at a location off said secondary axis.

2. The Raman scattering detector as claimed in claim 1, wherein:
   said source of collimated, substantially monochromatic light includes
   a laser diode, and
   a collimating lens,
   said laser diode and collimating lens fixed in position during manufacture to said first right angle face of said first right angle prism.

3. The Raman scattering detector as claimed in claim 1, wherein:
   said at least one photosensitive detector includes a plurality of photosensitive detectors disposed on said focal plane of said focussing lens, each photosensitive detector disposed at a location off said secondary axis of the expected focal location of a corresponding wavelength of Raman scattered light.

4. The Raman scattering detector as claimed in claim 1, wherein:
   said at least one photosensitive detector consists of an array of a plurality of photosensitive detectors.

5. The Raman scattering detector as claimed in claim 4, wherein:
   said array of a plurality of photosensitive detectors is a charge coupled device.

6. The Raman scattering detector as claimed in claim 1, wherein:
   said at least one photosensitive detector includes a single photosensitive detector movably disposed on said focal plane of said focussing lens for motion to the expected focal location of corresponding wavelengths of Raman scattered light.

7. The Raman scattering detector as claimed in claim 1, wherein:
   said source of monochromatic light produces S-polarized light with respect to said holographic optical element.

8. The Raman scattering detector as claimed in claim 1, wherein:
   said concentrating lens is aspheric.

9. A Raman scattering detector comprising:
   a source of collimated, substantially monochromatic light along an primary optical axis;
   a first prism having a first face disposed perpendicular to said primary optical axis, an oblique face, and a convex face disposed substantially parallel to said primary optical axis, said convex face forming a focussing lens disposed parallel to said primary optical axis having a secondary optical axis perpendicular to said primary optical axis for focussing Raman scattered light diffracted by said holographic optical element at a focal plane;
   a holographic optical element disposed parallel to said oblique face of said first right angle prism, said holographic optical element having embedded therein regions of alternating indices of refraction for passing said monochromatic light substantially undiffracted while diffracting light tt the wavelengths of expected Raman scattered light through an angle of approximately 90 degrees;

a sample cell disposed on said primary optical axis beyond said first prism for holding a sample substance to be irradiated;

a second prism disposed between said holographic optical element and said sample cell having an oblique face disposed parallel to said holographic optical element, and a convex face disposed substantially perpendicular to said primary optical axis, said convex face forming a concentrating lens disposed perpendicular to said primary optical axis for concentrating said monochromatic light on the sample within said sample cell and for collimating Raman scattered light parallel to said primary optical axis; and at least one photosensitive detector disposed on said focal plane of said focussing lens at a location off said secondary axis.

10. The Raman scattering detector as claimed in claim 7, wherein:
said source of collimated, substantially monochromatic light includes
a laser diode, and
a collimating lens,
said laser diode and collimating lens fixed in position upon manufacture to said first face of said first prism.

11. The Raman scattering detector as claimed in claim 9, wherein:
said at least one photosensitive detector includes a plurality of photosensitive detectors disposed on said focal plane of said focussing lens, each photosensitive detector disposed at a location off said secondary axis of the expected focal location of a corresponding wavelength of Raman scattered light.

12. The Raman scattering detector as claimed in claim 9, wherein:
said at least one photosensitive detector consists of an array of a plurality of photosensitive detectors.

13. The Raman scattering detector as claimed in claim 12, wherein:
said array of a plurality of photosensitive detectors is a charge coupled device.

14. The Raman scattering detector as claimed in claim 9, wherein:
said at least one photosensitive detector includes a single photosensitive detector movably disposed on said focal plane of said focussing lens for motion to the expected focal location of corresponding wavelengths of Raman scattered light.

15. The Raman scattering detector as claimed in claim 9, wherein:
said source of monochromatic light produces S-polarized light with respect to said holographic optical element.

16. The Raman scattering detector as claimed in claim 9, wherein:
said concentrating lens formed of said convex face of said second prism is aspheric.

* * * * *

UNITED STATES PATENT AND TRADEMARK OFFICE
CERTIFICATE OF CORRECTION

PATENT NO. : 5,011,284

DATED : April 30, 1991

INVENTOR(S) : Tedesco et al.

It is certified that error appears in the above-identified patent and that said Letters Patent is hereby corrected as shown below:

Column 1, line 9, "expected certain" should be --expected at certain--;

Column 1, line 43, "material,s" should be --material's--;

Column 2, line 27, "PMT" should be --photomultiplier--;

Column 3, line 18, "ccmpact" should be --compact--;

Column 3, line 30, "the" should be --an--;

Column 4, line 27, "I3" should be --13--;

Column 4, line 55, "movable the" should be --movable in the--;

Column 4, line 56, "I70" should be --170--;

Column 5, line 7, "through approximately" should be in regular type, not italicized;

Column 5, line 12, "Low 780nm diffraction" should be --Low diffraction;

UNITED STATES PATENT AND TRADEMARK OFFICE
CERTIFICATE OF CORRECTION

PATENT NO. : 5,011,284
DATED : April 30, 1991
INVENTOR(S) : Tedesco et al.

It is certified that error appears in the above-identified patent and that said Letters Patent is hereby corrected as shown below:

Column 5, line 13, "ciency is" should be --ciency at 780 nm is--

Column 5, line 14, "to the" should be --to reach the--;

Column 5, line 28, "ruqged" should be --rugged--;

Column 5, line 28, "oonstruc-" should be --construc- --;

Column 7, line 3, "tt" should be --at--;

In the Abstract, line 7, "leans" should be --lens--.

Signed and Sealed this

Fifth Day of January, 1993

Attest:

DOUGLAS B. COMER

*Attesting Officer*  *Acting Commissioner of Patents and Trademarks*